(12) United States Patent
Schwarzbich

(10) Patent No.: US 9,500,217 B2
(45) Date of Patent: Nov. 22, 2016

(54) METHOD FOR PRODUCING THREADED PARTS

(71) Applicant: Jörg Schwarzbich, Bielefeld (DE)

(72) Inventor: Jörg Schwarzbich, Bielefeld (DE)

(*) Notice: Subject to any disclaimer, the term of this patent is extended or adjusted under 35 U.S.C. 154(b) by 30 days.

(21) Appl. No.: 14/411,064

(22) PCT Filed: Jun. 26, 2013

(86) PCT No.: PCT/EP2013/063392
§ 371 (c)(1),
(2) Date: Dec. 23, 2014

(87) PCT Pub. No.: WO2014/005901
PCT Pub. Date: Jan. 9, 2014

(65) Prior Publication Data
US 2015/0152908 A1 Jun. 4, 2015

(30) Foreign Application Priority Data
Jul. 3, 2012 (DE) .................... 20 2012 105 890 U

(51) Int. Cl.
| B21F 3/06 | (2006.01) |
| B21F 45/00 | (2006.01) |
| B21F 3/02 | (2006.01) |
| B21F 3/04 | (2006.01) |
| F16B 37/12 | (2006.01) |
| B23K 11/00 | (2006.01) |

(52) U.S. Cl.
CPC ................. *F16B 37/12* (2013.01); *B21F 3/02* (2013.01); *B21F 3/04* (2013.01); *B21F 3/06* (2013.01); *B21F 45/00* (2013.01); *B23K 11/002* (2013.01); *F16B 37/122* (2013.01)

(58) Field of Classification Search
CPC .................. B21F 3/02; B21F 3/04; B21F 3/06
USPC ............. 72/135, 137; 470/8–10, 18, 25, 905
See application file for complete search history.

(56) References Cited

U.S. PATENT DOCUMENTS

| 1,181,971 A | | 5/1916 | Lovell | |
| 2,439,685 A | * | 4/1948 | Findley | .......................... 411/438 |
| 3,162,228 A | | 12/1964 | Rosan et al. | |
| 4,040,462 A | * | 8/1977 | Hattan | .......................... 411/277 |
| 4,889,327 A | * | 12/1989 | Seyler | ....................... B21F 3/04 |
| | | | | 267/168 |

FOREIGN PATENT DOCUMENTS

| AT | 10968 | 2/1903 |
| DE | 732020 | 2/1943 |

(Continued)

OTHER PUBLICATIONS

English Translation of DE202006012713.*

*Primary Examiner* — Shelley Self
*Assistant Examiner* — Patrick Gunson
(74) *Attorney, Agent, or Firm* — Richard M. Goldberg

(57) ABSTRACT

A method for producing a threaded part, includes the following steps: preparing a wire (54) with a rectangular cross-section; winding-up the wire (54) to form a helical spring with tightly wound windings, the wire being fed such that the sides of the rectangle defining the cross-section extend obliquely to the axis of the helical spring; and connecting the windings to each other at their mutually adjoining contact surfaces.

4 Claims, 3 Drawing Sheets

(56) References Cited

FOREIGN PATENT DOCUMENTS

| | | |
|---|---|---|
| DE | 1076847 | 8/1960 |
| DE | 1964035 | 7/1967 |
| DE | 1603834 | 6/1970 |
| DE | 2635188 A1 | 2/1978 |
| DE | 8713708 U1 | 1/1988 |
| DE | 69410071 T2 | 9/1998 |
| DE | 202006012713 U1 | 11/2006 |
| GB | 2186937 A | 8/1987 |

* cited by examiner

METHOD FOR PRODUCING THREADED PARTS

The invention relates to a method for producing a threaded part.

BACKGROUND OF THE INVENTION

More particularly, the invention relates to a method for producing cylindrical sleeves that have an internal and/or external thread.

In conventional methods, a turned part having a cylindrical internal or external peripheral surface, respectively, is produced in a first step, and then a thread is cut or rolled into that surface.

SUMMARY OF THE INVENTION

It is an object of the invention to provide a method that permits a low-cost production of threaded parts.

According to the invention, this object is achieved by the methods indicated in the claims.

According to the invention, this object is achieved by the methods indicated in the independent claims 1 and 2.

In one embodiment, the method comprises the following steps:
  providing a wire that has a non-rectangular cross-section,
  winding the wire to a helical spring with windings held in tight engagement with one another, and
  joining the windings at contact surfaces with which they are in engagement with one another.

Due to the non-rectangular cross-sectional shape of the wire, the helical spring does not have a smooth, cylindrical surface on its inner and/or outer periphery, but instead forms a surface that has a sequence of projections and recesses alternating in the raster of the spring turns. These projections and recesses form the thread crests and thread roots of the threaded part.

In another embodiment, the wire has a rectangular or square cross-section but is oriented such that the sides of the rectangle are inclined relative to the axis of the helical spring. In case of a square cross-section, the squares that define the cross-sections of the individual turns are contacting each other only with two opposite corners, whereas, of the remaining two corners of the square, one points inwardly towards the axis of the spring and the other points outwardly, so that an internal thread is formed on the inner periphery of the spring and at the same time an external thread is formed on the outer periphery.

The steps of the methods according to the invention can be performed very efficiently and at low costs, so that the production costs of the threaded parts are lower than the costs of conventional methods in which machining steps such as milling, thread cutting and the like are required.

Another advantage is that the threaded parts produced in this way have a lower weight. In particular when such threaded parts are used in the automotive vehicle industry, significant savings in weight can be achieved in view of the large number of threaded parts.

As practically no cutting-type processing is required for producing the threaded part, it is possible to use a high-strength spring steel wire for winding the helical spring, so that one obtains accordingly a heavy-duty thread.

Advantageous details of the invention are indicated in the dependent claims.

The method is suitable for threaded parts made of both, metal or plastics. In the latter case, the "wire" is made of extruded plastics and is wound to fatal the helical spring in a condition in which it has not yet completely solidified. Then, the welding of the turns can be achieved by utilizing the residual heat of the plastic material simply by compressing the spring or, if necessary, by using ultrasound or other means for heating the spring in particular at the locations where the turns are in engagement with one another.

In case of threaded parts made of metal, a resistance welding method is particularly suited for welding the turns.

Threaded parts that have been manufactured by the method according to the invention may be used for example for forming tolerance compensation members in devices for connecting structural parts.

In an advantageous embodiment, at least one end of the helical spring is fitted with an end piece that has a groove that is complementary to the last turn of the helical spring. The turn that forms the end of the helical spring is accommodated in this groove in such a manner that the helical spring is stably supported at the end piece in a position in which the axis of the helical spring is coincident with the axis of the end piece and/or extends exactly at right angles relative to the end face of the end piece in which the groove has been formed.

BRIEF DESCRIPTION OF THE DRAWINGS

Embodiment examples will now be described in detail in conjunction with the drawings, wherein.

DETAILED DESCRIPTION

Figure 1:
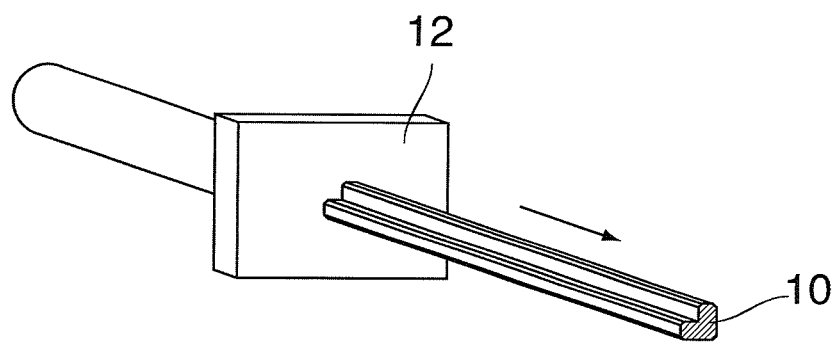
FIGS. 1 to 3 are schematic views for illustrating different steps of the method according to the invention.

According to FIG. 1, a wire 10, e.g. a metal wire, is drawn through a drawing die 12 that gives the wire a non-rectangular cross-sectional shape. In the example shown, the wire 10 is given an L-shaped cross-section. Optionally, a wire having the desired cross-sectional shape can also be provided by rolling.

Figure 2:
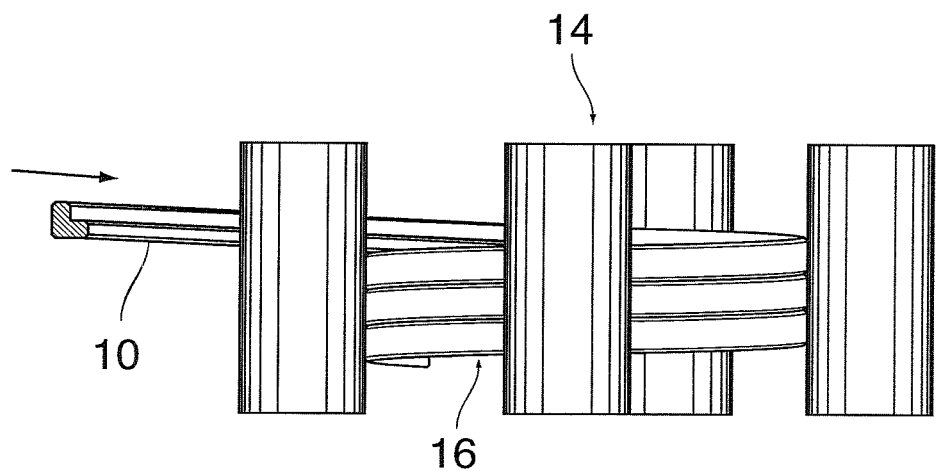

According to FIG. 2, the wire 10 is supplied to a winder 14 where it is wound to form an endless helical spring 16 with turns being held in tight engagement with one another. In the example shown, the wire 10 is supplied such that the leg of the L-shaped cross-section that extends in axial direction of the helical spring forms the outer periphery, whereas the radial leg points inwardly. The axial legs, together, form an essentially cylindrical outer peripheral surface of the helical spring 16, whereas the radial legs at the inner periphery of the helical spring 16 form an internal thread with an alternating sequence of thread grooves and crests.

When a threaded part with an external thread is to be manufactured, the wire 10 is supplied in a different orientation, so that the axial leg is on the inner side and the radial leg points outwardly. An example of a helical spring 18 that has been manufactured in this way is shown in an axial section in FIG. 3.

Figure 3:
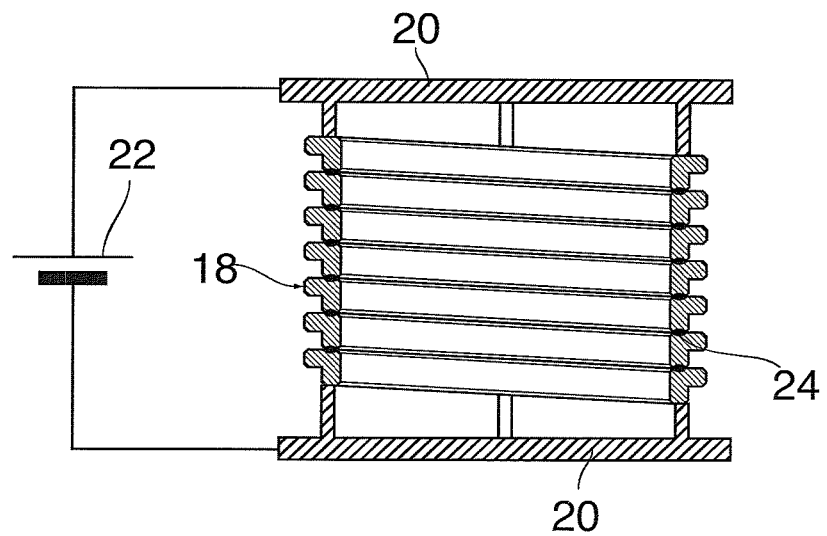

The helical spring 16 or 18 is then cut to the desired length and clamped between electrodes 20 as has been shown in FIG. 3. The electrodes are preferably made of a material that has a higher conductivity than the wire 10, e.g. copper. When the electrodes 20 are connected to a voltage source 22, a current flows in axial direction through the helical spring 18. The largest electrical resistance will then occur in those locations where the turns of the wire are engaging each other. Optionally, the resistance can be increased by giving the wire 10 a profile that has a narrow ridge at the position where, later, the turns will be engaging each other, so that the turns make contact only on a smaller surface area.

Due to the high electrical resistance, the windings of the wire are welded together at the points where they are in contact with each other. The corresponding weld seams are designated with the reference numeral 24 in FIGS. 3.

In this way, one finally obtains a threaded part in the form of a rigid cylindrical sleeve that has an internal and/or external thread, depending upon the orientation of the wire during winding. Depending upon the winding direction, it is also possible to obtain either a right-handed thread or a left-handed thread, as desired.

Likewise, by using a plurality of wires that are supplied in parallel, it is also possible to produce a multi-start thread. The thread profile is eventually determined by the profile of the wire 10 and may therefore be controlled by selecting a suitable wire profile. With a suitable profile of the wire, it is also possible to produce threaded parts that have both, an internal thread and an external thread.

It is also possible to weld metal end pieces to one end or both ends of the proper threaded sleeve. These welding steps may be performed concurrently with welding together the individual turns of the spring. Finally, it is also possible to shrink a threaded sleeve onto a metal part, so that one obtains, for example, a massive threaded bolt. Conversely, a threaded sleeve having an internal thread may be pressed or welded into a bore of a larger structural part.

It is also possible to weld metal end pieces to one end or both ends of the proper threaded sleeve. These welding steps may be performed concurrently with welding together the individual turns of the spring. Finally, it is also possible to shrink a threaded sleeve onto a metal part, so that one obtains, for example, a massive threaded bolt. Conversely, a threaded sleeve having a internal thread may be pressed or welded into a bore of a larger structural part.

FIGS. 4 to 8 show examples of possible designs of threaded parts.

Figure 4:
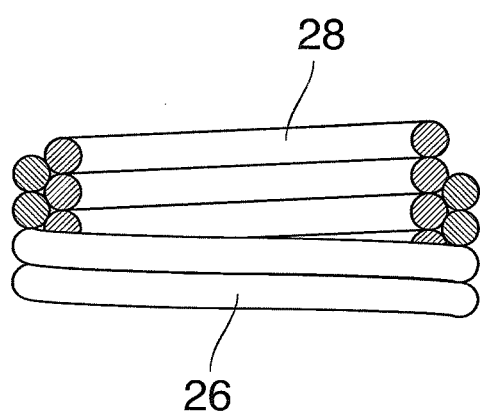
FIGS. 4 to 8 show examples of threaded parts wound from wires that have different cross-sectional shapes.

In FIG. 4, an internally threaded part 26 is formed by a helical spring that is wound from a wire with a round cross-section, with the windings being in tight engagement. Similarly, a matching externally threaded part 28 is formed by a helical spring wound tightly from round wire. Due to the round cross-section of the wire, the internal surface of the internally threaded part 26 fauns, between the individual turns, helically extending recesses into which the outer apexes of the turns of the externally threaded part may engage, so that a threaded engagement is achieved.

Figure 5:
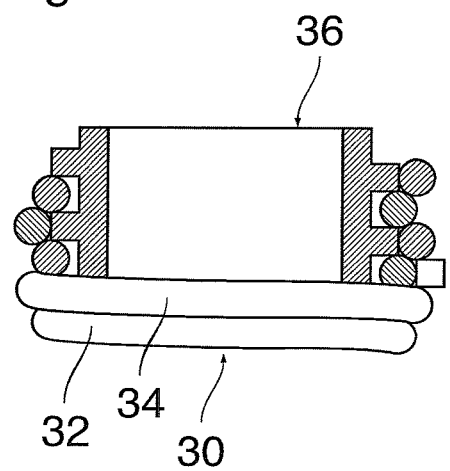

FIG. 5 shows an example in which an internally threaded part 30 is formed by two nested helical springs 32 and 34 the turns of which are arranged alternatingly and are in engagement with one another. The spring 32 has a somewhat smaller diameter than the spring 34 and thereby forms an internal screw thread the thread grooves of which are wider and deeper than in FIG. 4. A corresponding outer screw thread of an externally threaded part 36 may engage into this internal screw thread. In the example shown here, the externally threaded part is a milled metal part having a rolled or cut external screw thread.

Figure 6:
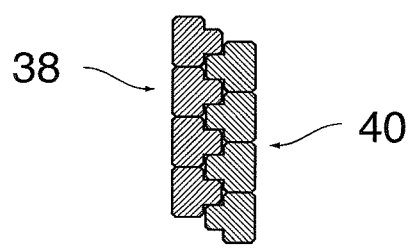

FIG. 6 shows an embodiment in which, again, both threaded parts 38 and 40 are wound from wire. What has been shown here is only a part of the peripheral wall of the threaded parts being in threaded engagement with one another. In this example, the wire of both support bodies has a T-shaped cross-section. The cross bars of the "T" are held tightly against one another whereas the central webs of the "T" form the engaging thread grooves and crests.

Figure 7:
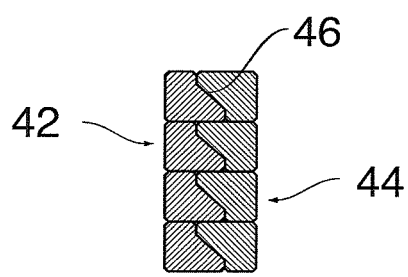

In FIG. 7, an internally threaded part 42 and an externally threaded part 44 are wound from a wire the cross-sectional shape of which is similar to the L-shape shown in FIGS. 1 and 2, but with the difference that the complementary thread grooves and crests have inclined flanks 46.

Figure 8:
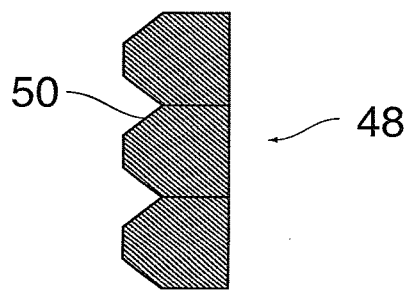

Finally, FIG. 8 shows a section of a part of an externally threaded part 48 that is wound from a wire with a hexagonal cross-section. The corners of the hexagon on the inner side of the helical spring form 90°-corners, so that the turns of the wire will form a smooth internal surface of the helical spring, whereas external thread grooves 50 with a triangular cross-section are formed on the outward side.

Figure 9:
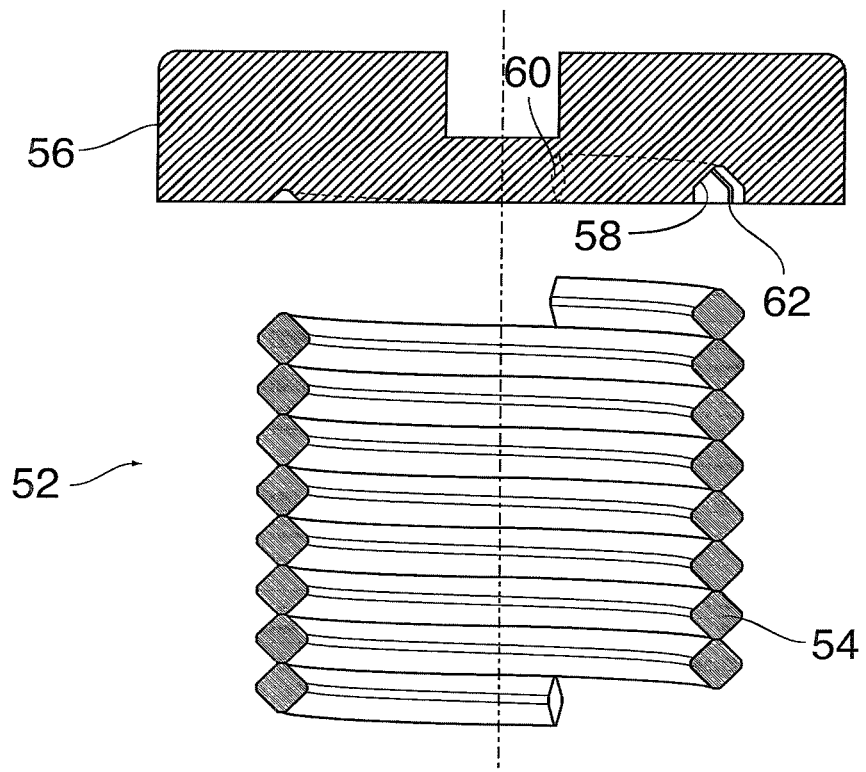
FIG. 9 is an exploded sectioned view of a bolt manufactured in accordance with another embodiment of the method according to the invention.
Figure 10:
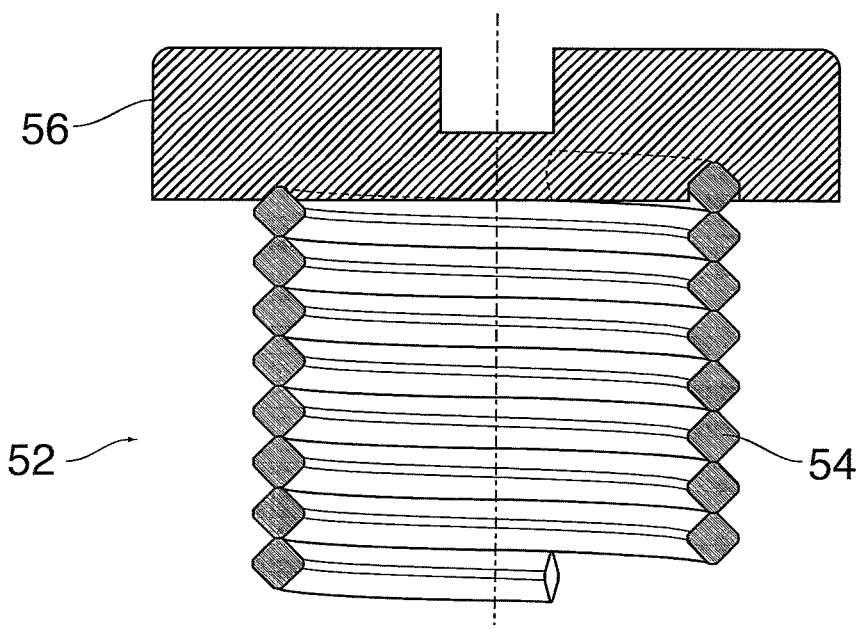
FIG. 10 is a sectional view of the bolt shown in FIG. 9 in the final state.

FIG. 9 is an exploded view of a threaded part 52 configured as a shoulder bolt. The threaded shaft consists of a helical spring that is wound from a wire 54 which, in this case, has a square cross-section with slightly rounded or chamfered corners. The wire is supplied in such an orientation that the cross-sectional shape corresponds to a rhomb, i.e. a tipped square. The tightly engaged turns engage each other only with the corners of the squares that are facing each other, whereas the remaining corners of each square form an internal thread on the inner side of the helical spring as well as an external thread on the outer side.

Fitted to one end of the helical spring is an end piece 56 that forms the slotted head of the shoulder bolt. On the flat surface facing the helical spring, the end piece 56 has a punched or pressed annular groove 58 the depth of which varies in circumferential direction in such a manner that the groove is complementary to the last turn of the helical spring. The end of the wire 54 abuts against an end face 60 formed in the groove 58 where the depth of the groove changes discontinuously from a maximum value (corresponding to the pitch height of the thread) to zero, from where it will then increase again continuously. In this way, the helical spring is supported on the end piece 56 in such a manner that the axis of the helical spring is exactly at right angles to the face of the end piece in which the groove 58 is formed.

Again, the helical spring can be joined with the end piece by welding, e.g. resistance welding in case of metal parts. In order to increase the electrical resistance at the transition from the end piece 56 to the wire 54 of the helical spring, small projections or ribs 62 may be punched in the internal wall of the groove 58, which ribs will initially decrease the contact area and will then melt away during welding.

The invention claimed is:

1. A method of producing a threaded part, comprising the steps of:
    providing a metal wire with a non-rectangular cross-section,
    winding the wire to a helical spring with a plurality of turns held in tight engagement with one another, and
    after the step of winding, joining the turns to one another at all engaging contact surfaces thereof which include at least a plurality of contact surfaces between ends of the metal wire,
    wherein the step of joining the turns includes the steps of:
        clamping opposite ends of the helical spring between electrodes such that the plurality of turns are held between the electrodes, and causing a current to flow through the helical spring to weld together adjacent turns of the helical spring due to electrical resistance at the plurality of contact surfaces between the adjacent turns so as to join together the adjacent turns by resistance welding.

2. A method of producing a threaded part, comprising the steps of:

providing a metal wire with a rectangular cross-section, winding the wire to a helical spring with a plurality of turns held in tight engagement with one another, the wire being supplied such that sides of the rectangle that define the cross-section are inclined relative to the axis of the helical spring, and after the step of winding, joining the turns to one another at all engaging contact surfaces thereof which include at least a plurality of contact surfaces between ends of the metal wire, wherein the step of joining the turns includes the steps of:

clamping opposite ends of the helical spring between electrodes such that the plurality of turns are held between the electrodes, and causing a current to flow through the helical spring to weld together adjacent turns of the helical spring due to electrical resistance at the plurality of contact surfaces between the adjacent turns so as to join together the adjacent turns by resistance welding.

3. The method according to claim 1, further comprising the step of fitting an end piece to at least one end of the helical spring, said end piece accommodating a last turn of the helical spring in a groove thereof that is complementary to the last turn.

4. The method according to claim 2, further comprising the step of fitting an end piece to at least one end of the helical spring, said end piece accommodating a last turn of the helical spring in a groove thereof that is complementary to the last turn.

\* \* \* \* \*